US005617839A

United States Patent [19]
Jennings et al.

[11] Patent Number: 5,617,839
[45] Date of Patent: Apr. 8, 1997

[54] RACK OVEN

[75] Inventors: Ralph E. Jennings, Overland Park, Kans.; Philip Tiberio, Jr., Shrewsbury, N.J.

[73] Assignee: Premark FEG Corporation, Wilmington, Del.

[21] Appl. No.: 606,840

[22] Filed: Feb. 26, 1996

[51] Int. Cl.⁶ .................................................. A21B 1/08
[52] U.S. Cl. .................. 126/20; 99/474; 99/476
[58] Field of Search ............... 126/20; 99/417, 99/474–476

[56] References Cited

U.S. PATENT DOCUMENTS

| | | | |
|---|---|---|---|
| 1,878,519 | 9/1932 | Hoppe . | |
| 2,767,667 | 10/1956 | Spooner | 107/54 |
| 3,905,760 | 9/1975 | Johansson et al. | 432/176 |
| 3,926,106 | 12/1975 | Deusing et al. | 99/447 |
| 3,954,053 | 5/1976 | Johansson et al. | 99/443 R |
| 4,029,463 | 6/1977 | Johansson et al. | 432/25 |
| 4,202,259 | 5/1980 | Johansson | 99/352 |
| 4,492,216 | 1/1985 | Dumont | 126/21 A |
| 4,515,143 | 5/1985 | Jabas | 126/21 A |
| 4,627,409 | 12/1986 | Kagomoto | 126/21 A |
| 4,779,604 | 10/1988 | Konig | 126/21 A |
| 4,782,214 | 11/1988 | Voegtlin | 219/401 |
| 5,129,384 | 7/1992 | Parks | 126/21 A |
| 5,394,791 | 3/1995 | Vallee | 99/427 |

*Primary Examiner*—Carroll B. Dority
*Attorney, Agent, or Firm*—Thompson Hine & Flory LLP

[57] ABSTRACT

A rack oven which comprises a baking chamber, a door providing access to the baking chamber, a combustion chamber containing a plurality of in-shot burners, a heat exchanger in combination with the combustion chamber containing a plurality of heat exchange tubes, a steam generator, one or more blower fans for circulating air in a closed path throughout the oven, and a ventor exhaust blower for expelling combustion gases.

20 Claims, 5 Drawing Sheets

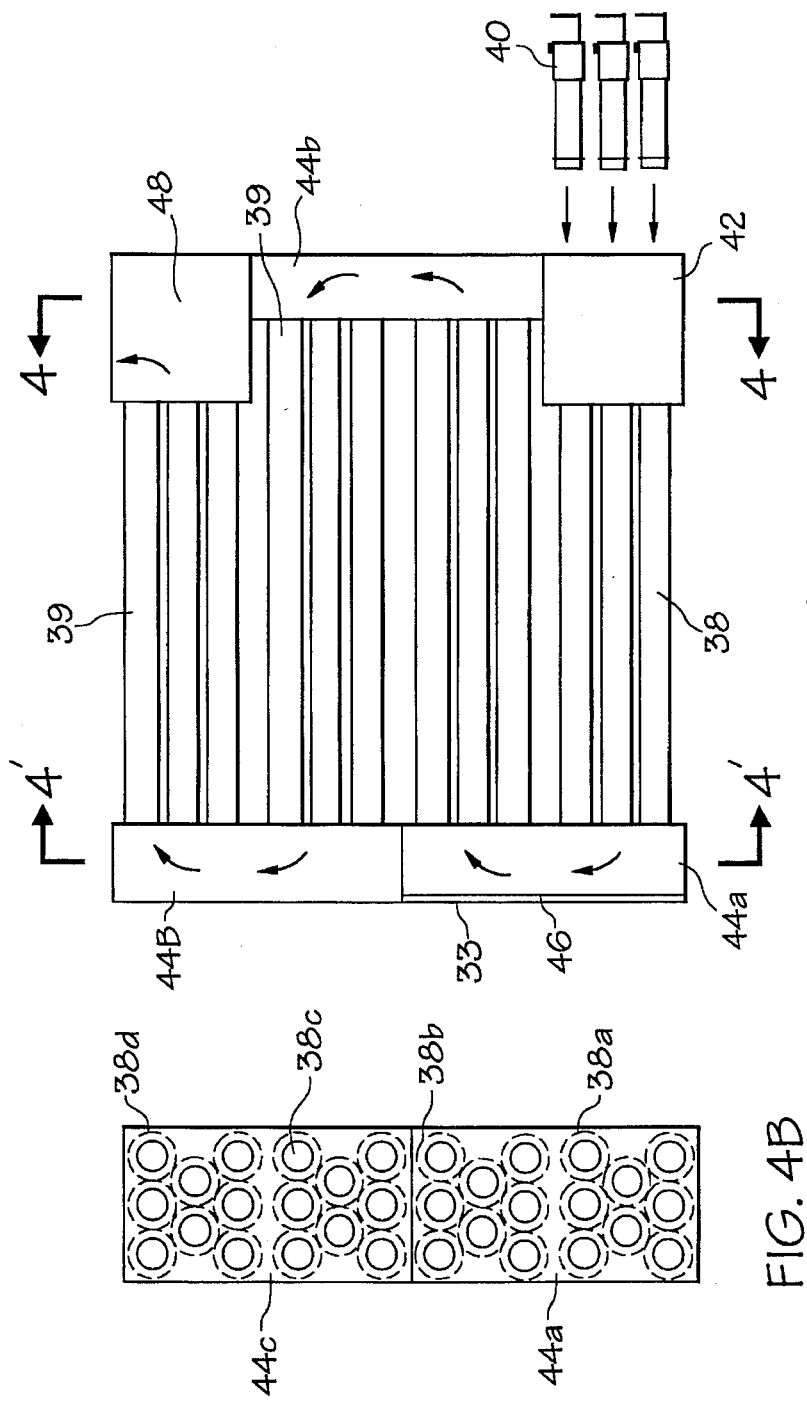

RACK OVEN

BACKGROUND OF THE INVENTION

This invention relates to rack ovens useful for baking or heating food products and, more particularly, to commercial rack ovens such as those used in the bakery industry.

Rack ovens are generally equipped with a fuel-fed heating element and a fan for moving heated air throughout a baking chamber to provide a rapid distribution of hot air over the food product. Commercial ovens of this type include a baking chamber, which is sized to receive a rack having multiple shelves containing products to be baked; a power driven, rotating mechanism to rotate the product as it is being cooked or baked; a combustion system including a single unit burner with a heat exchanger; an exhaust system to eliminate the combustion gases; and a circulating system for directing hot air across the products in the baking chamber. Conventional rack ovens of the type for baking bread generally include a steam generator for the introduction of steam into the oven for brief periods of time, usually at the beginning of the baking process, to impart a desired color and crispness to the crust of the bread.

A particular disadvantage of such ovens is the combustion/exhaust system. There are several main types of combustion/exhaust systems presently used in the manufacture of rack ovens. In one system, air for the combustion mixture is drawn into the system by the action of the flowing gas under pressure. Without any additional means for moving the combustion gases, it is critical that the system employ proper fluing to eliminate the combustion gases. Another system employs an external electrically powered fan which drives air into the combustion system. In this system, ignition of the gas/air mixture is quite often difficult to achieve. Furthermore, as the system accumulates dirt over a period of time, less air is forced into the system while the same amount of gas is being supplied. This causes the gas/air ratio to become progressively richer until delayed combustion occurs resulting in an explosion (commonly known as "puffs"). These explosions are not only hazardous to workers, but can be very destructive to the equipment.

In addition to the above combustion/exhaust system problems, other disadvantages of commercially available ovens are their bulkiness, high manufacturing costs and inefficient heating characteristics.

SUMMARY OF THE INVENTION

In accordance with the present invention, an oven such as a rotating rack oven is designed to provide an improved oven which is more compact, provides improved energy efficiency, costs less to manufacture, are generally safer than ovens currently available to the baking industry, and are not encumbered by the disadvantages of currently available combustion/exhaust systems.

In order to achieve the above improvements, the oven of the present invention comprises: a baking chamber defined by a plurality of wall structures; a door providing access to the interior of the baking chamber; a heat exchanger comprising a plurality of heat exchange tubes; a combustion chamber containing a plurality of gas fired in-shot burners, wherein each of the in-shot burners fires into a corresponding heat exchange tube; a steam generator located outside the oven chamber; one or more blowers located in the plenum above the heat exchange tubes for circulating air in a closed path throughout the oven, and an improved combustion/exhaust system.

This construction allows the oven to be designed as a much more compact and higher performing unit. The oven also offers a substantial improvement over the prior art ovens in terms of initial cost, energy efficiency and reduced warranty costs. Furthermore, the design of the oven provides for improved operational safety.

BRIEF DESCRIPTION OF THE DRAWINGS

FIG. 3 is a cross-sectional schematic view of the heat exchanger assembly of the invention;

FIG. 4a is a cross-sectional schematic view of the heat exchange tubes taken along line 4—4 of FIG. 4;

FIG. 4b is a cross-sectional schematic view of the heat exchange tubes taken along line 4'—4' of FIG. 4;

DETAILED DESCRIPTION OF THE INVENTION

Figure 1:
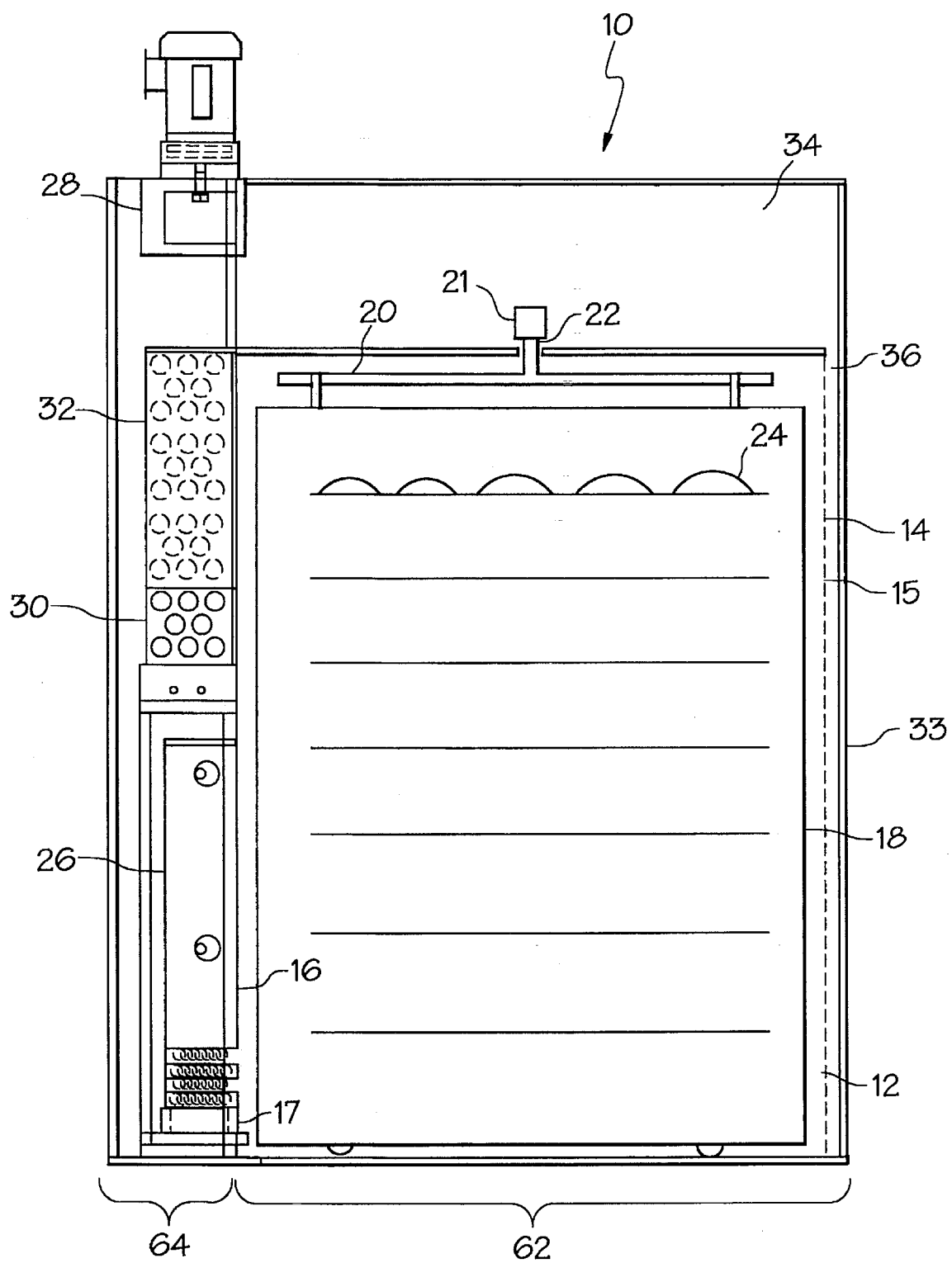
FIG. 1 is a cross-sectional schematic view taken across the front of the oven of the invention.

As illustrated in FIG. 1, the oven 10 of the present invention consist of two main sections. The first section 62 consists of the baking chamber 12 and the second section 64 contains a steam generator 26; a combustion chamber 30 which contains a plurality of gas fired in-shot burners 40 (FIG. 3), a heat exchanger 32 and one or more blowers 28 for drawing moisture-containing air from the steam generator 26 and forcing the moisture-containing air through the heat exchanger 32 and into the baking chamber 12.

A typical oven 10, as shown in FIG. 1, has a baking chamber 12 which includes an apertured upstream wall 14 and a partially apertured downstream wall 16. Disposed within the chamber 12 is a removable wheeled rack 18 connected at its upper end to a rotatably power driven vertical shaft 22. The products 24 to be baked such as bread are placed in pans or on baking sheets held by rack 18 which rotates to uniformly expose the products 24 to heated, steam-containing air as it flows through the baking chamber 12.

In accordance with the present invention, the products 24 to be baked are loaded onto a wheeled rack 18 and placed in the baking chamber 12 and the door (not shown) is closed causing the rack 18 containing the products 24 to be lifted off the floor by a lift mechanism 20 as the door closes and then made to rotate by motor 21 attached to vertical shaft 22. Steam produced by the steam generator 26 is made to infiltrate the entire oven 10 by the fan 28 where the moisture condenses on the cool surface of the unbaked products 24. After a period of about 10 to 30 seconds, the steam is discontinued or continued in defined cycles, depending on the food product being baked, and the baking cycle started. During the baking cycle, heated air is continually circulated in a closed path throughout the entire oven 10. The air exits the baking chamber 12 through aperture 17 in a partially apertured downside wall 16 where it enters the steam generator 26 heating the steam generator 26 and picking up additional moisture if desired. While the steam generator 26 can be selected from any of the steam generators employed in the prior art to supply steam to a rack oven, it has been found that a particularly effective steam generator is that described in commonly assigned U.S. Pat. No. 5,394,791 to Vallee, the contents of which are incorporated herein by reference to the extent necessary to describe the steam generator 26. The moisture-containing air is drawn through the steam generator 26 where the heated, moisture-containing air picks up speed as it is pulled through the heat exchanger 32 by one or more blower fans 28 located in the plenum section 34 at the top of the oven 10. From the plenum section 34, the air enters one or more air distribution ducts 36 where it is distributed to the baking chamber 12 through the apertures 15 in wall 14. The heated air then circulates through the baking chamber 12 contacting the baking products 24 and exits through the apertures in wall 16. The cycle is repeated continuously for a period of time determined by the baking conditions and the product being baked.

Figure 2:
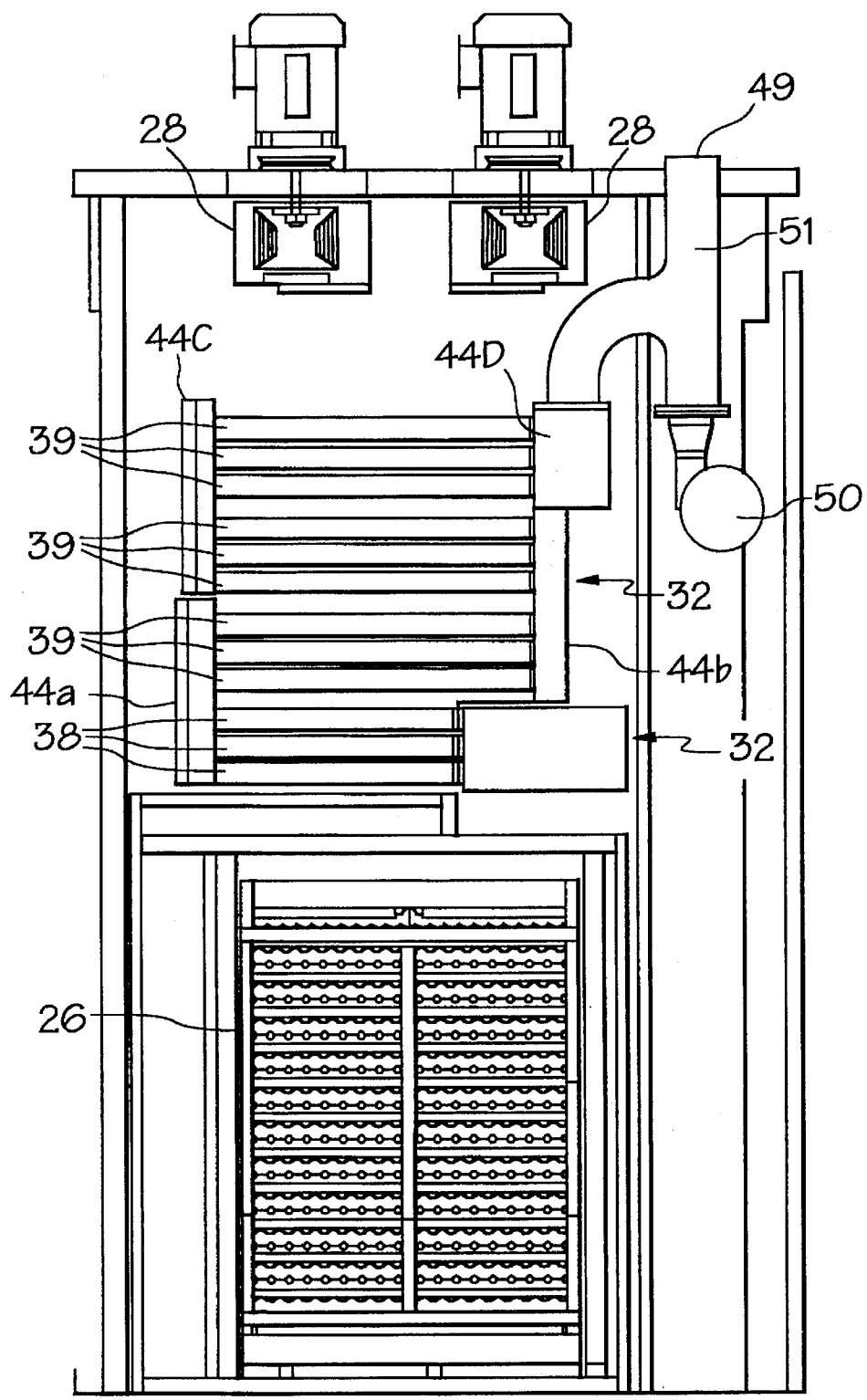
FIG. 2 is a cross sectional view taken across the side of the oven and toward the baking chamber illustrating the exhaust fan, oven fan, combustion chamber, heat exchanger, and steam generator assembly of the invention.
Figure 5:
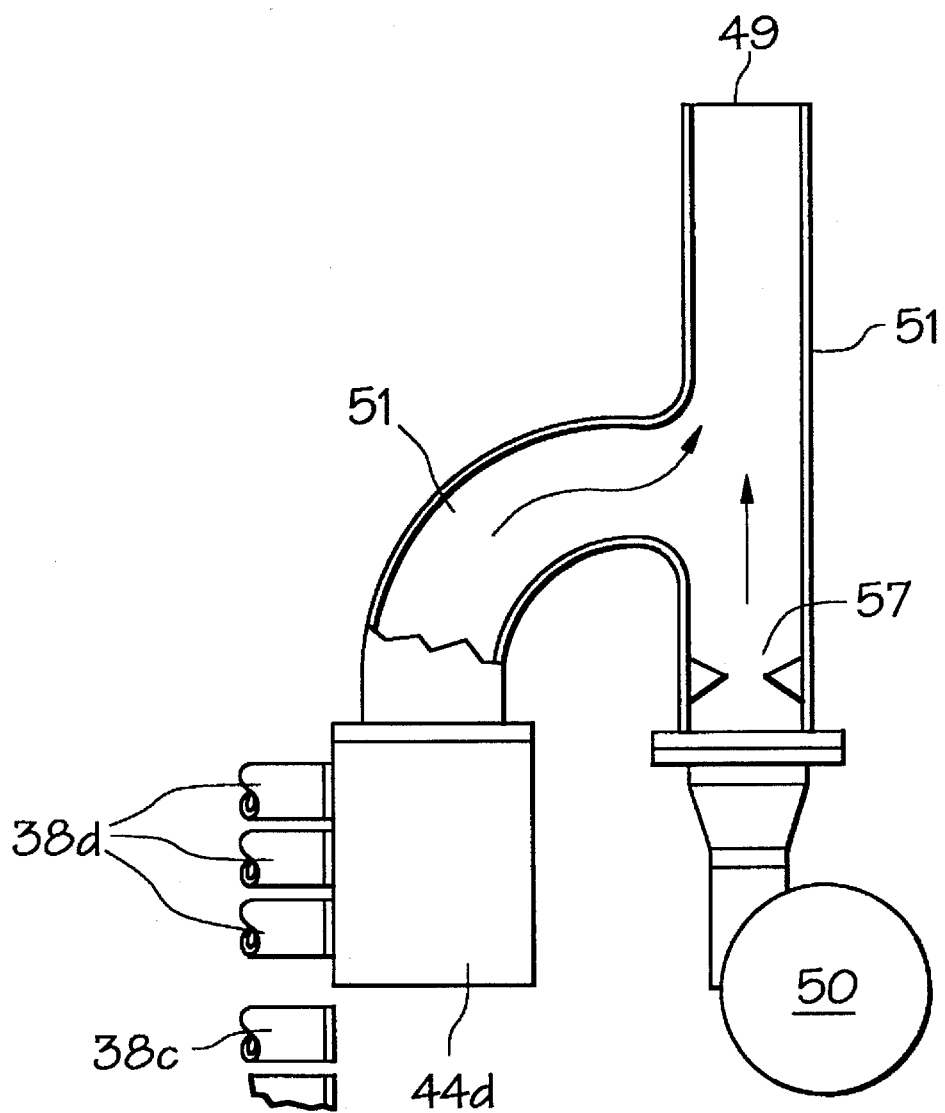
FIG. 5 is a cross-sectional schematic view of the exhaust system of the invention.

FIG. 2 is a cross sectional schematic illustration of the second section of the oven 10 which contains a steam generator 26, combustion chamber 30, and a heat exchanger 32. The air from the baking chamber 12 (FIG. 1) passes over the steam generator 26 where it picks up moisture (if necessary) and is then drawn through heat exchanger 32 containing a series of elongated heat exchange tubes 38a–38d which heats the moisture-containing air. In a first section of the heat exchanger 32, the elongated heat exchange tubes 38a are heated by a corresponding number of "in-shot" burners 40 (shown in FIG. 3) which fire directly into the heat exchanger tubes 38a. The hot combustion gases from the burners 40 are then circulated through a second section of heat exchanger tubes 38b–38d heating these tubes to a high temperature in order to transfer sufficient heat to the air passing over the heat exchange tubes 38a–38d. The combustion gases passing through the heat exchange tubes 38a–38d are vented into the atmosphere through exhaust outlet 48.

As shown in FIG. 3, combustion chamber 30 contains a plurality of in-shot burners 40 which are gas-fueled burner tubes having a length of about 3 to 8 inches and a diameter of 1 to 1½ inches. The in-shot burners 40 each have a firing rate of about 20,000 to 35,000 BTU's and are typically aligned with a corresponding number of heat exchange tubes 38a which represent a first section of heat exchange tubes 38a–38d so that the flame from each in-shot burner 40 extends directly into the corresponding heat exchange tube 38a to a distance of about three-fourth the length of the heat exchange tube 38a to substantially the full length of the heat exchange tubes 38. The heat exchange tubes 38 of the present invention are not only multiple, but each tube is 2 to 3 times smaller in diameter than currently used heat exchange tubes. The length of heat exchange tubes 38 of the present invention is typically about 14 to 30 inches and the diameter is about 1 to 2 inches. The multiple heat exchange tubes 38a–38d having the present dimensions provide improved efficiency in the present heat exchange system as opposed to conventional heat exchange systems.

In a preferred aspect of the invention, each of the in-shot burners 40 contains a heat deflector (not shown), commonly called a heat transfer promotor or a turbulator to enhance the heat transfer rate out of the combustion tubes. Typically, the heat deflector is manufactured from stainless steel and has a spiral or corkscrew-like shape. The in-shot burners also typically contain "puff" panels or blow out panels in the burners to preclude accumulation of gas and prevent explosion. The use of such heat deflectors and "puff" panels are known in the art.

In addition to the in-shot burners 40, the combustion chamber 30 contains a pilot ignitor tube (not shown) which is in direct communication with each of the in-shot burners 40 as well as a supply line for fuel and an orifice for admitting gas. The shape of the pilot ignitor tube is not critical and, typically, is an "S" shaped tube or a "U" shaped tube. A "U" shaped tube has been found to be particularly useful in the construction of the combustion unit 30 of the present invention. The combustion unit 30 further contains a flame sensor and fuel control means (neither of which are shown). As indicated above, each of these components is manufactured and assembled independently rather than as a pre-formed package to ensure maximum safety in operation of the components.

The unique design of the combustion chamber 30 allows the components to be manufactured separately and assembled independently into the combustion chamber 30. This design and manufacture of the combustion chamber 30 is particularly advantageous in that each component can be easily assembled within desired tolerances as a single component during or after manufacture of the oven 10. From a safety standpoint, the use of modular components is highly desirable.

In the present invention, the first set of heat exchange tubes 38a, typically about 8 tubes arranged in alternating rows of 3 and 2, are advantageously heated directly by the flame from the in-shot burners 40. The remaining heat exchange tubes 38b, 38c and 38d represented in FIG. 3 as consisting of three separate sets are heated by the extremely hot combustion gases produced by the in-shot burners 40 firing into the corresponding of heat exchange tubes 38a. The remaining three sets of exchange tubes 38b, 38c and 38d may have the same physical configuration and dimensions as the first plurality of heat exchange tubes 38a or the configuration and dimensions may be different. Typically, they are linear, arranged horizontally and have a length of about 14 to 30 inches and a diameter of about 1 to 2 inches. Typically, the heat exchanger 33 is a four-pass heat exchanger, i.e., the combustion gases from the heat exchanger passes through heat exchange tubes 38a, 38b, 38c and 38d and gas-collection ducts 44a, 44b, 44c and 44d. FIGS. 4a and 4b are cross-section views of the combustion gas collection ducts 44a–44d taken along lines 4—4 and 4'—4', respectively, to provide an end view illustration of the heat exchanger tubes 38a–38d.

The combustion gases exiting the heat exchange tubes 38a into the combustion gas-collection duct 44a is sufficiently hot enough to adversely affect the rear steel wall 33 of the heat exchanger 32 over a period of time. Accordingly, there is provided by the present invention, one or more ceramic tile inserts 46 strategically placed on the rear wall 33 of gas collection duct 44a to deflect the hot exhaust gases entering combustion gas-collection duct 44a from the first plurality of heat exchange tubes 38a into the second plurality of heat exchange tubes 38b. The ceramic tile inserts 46 may be of any configuration to effectively deflect the hot combustion gases. It is preferred to position the ceramic tile inserts 46 in a slightly angular configuration so that the hot combustion gases are directed upward to the entrance of the second set of heat combustion tubes 38b. After passing through the last plurality of heat exchange tubes 38d, the hot combustion gases are expelled through flue 49 by ventor fan 50. As shown in FIG. 2, the combustion gases, after entering gas-collection duct 44d, are directed into flu 49 through a "T" duct 51. These exhaust gases are typically at a temperature of about 700° to 800° F. In order to assist with moving the exhaust gases through the heat exchange tubes 38a–38d and out through the flu 49, a ventor fan 50 powered by an electric motor (not shown) is employed to blow ambient air into the "T" duct through a nozzle 57 (see FIG. 4). The nozzle 57 provides a reduced opening which develops a high velocity flow of ambient air. As the ambient air passes by the exhaust duct 51, it induces flow of the combustion gases in the exhaust duct 51 by creating a vacuum (about 0.2 to 0.4 inches Hg) in the exhaust duct 51 such that the hot exhaust gases are expelled out through the flu 49 along with the high velocity ambient air.

In accordance with the exhaust system of the present invention, the ventor van 50 operates to draw the hot exhaust gases from the heat exchanger so that there is a constant flow of air in the burners to provide a smoother and more effective ignition. To further provide proper operation, safety switches which insure that there is a vacuum in the combustion chamber, i.e., air movement, before the burners are turned on, may be installed in the system.

Another feature of the heat exchanger/ventor fan system is that, in the event of a leak in the system, oven air will be drawn into the heat exchanger and exhausted through the flu 49 because of the vacuum. In other systems, the hot combustion gases would leak out into the oven because the heat exchanger system would be pressurized.

The operation of the ventor fan 50 in accordance with the present invention is highly desirable because the fan and motor assembly are never exposed to the extremely hot combustion gases (700° to 800° F.). Accordingly, the fan and motor can be expected to have substantially longer lives than those which are exposed to the hot combustion gases.

The heat exchanger 32 of the present invention is not only uniquely different from commonly used heat exchangers in the length and diameter of the heat exchange tubes 38a–38d but also in the type of material used and in the manufacturing technique. The heat exchange tubes are manufactured from aluminized steel, which is not only economically favorable over stainless steel but also provides greater thermal conductivity than stainless steel. Aluminized steel, however, has never before been used in the manufacture of rotating rack ovens.

Figure 6:
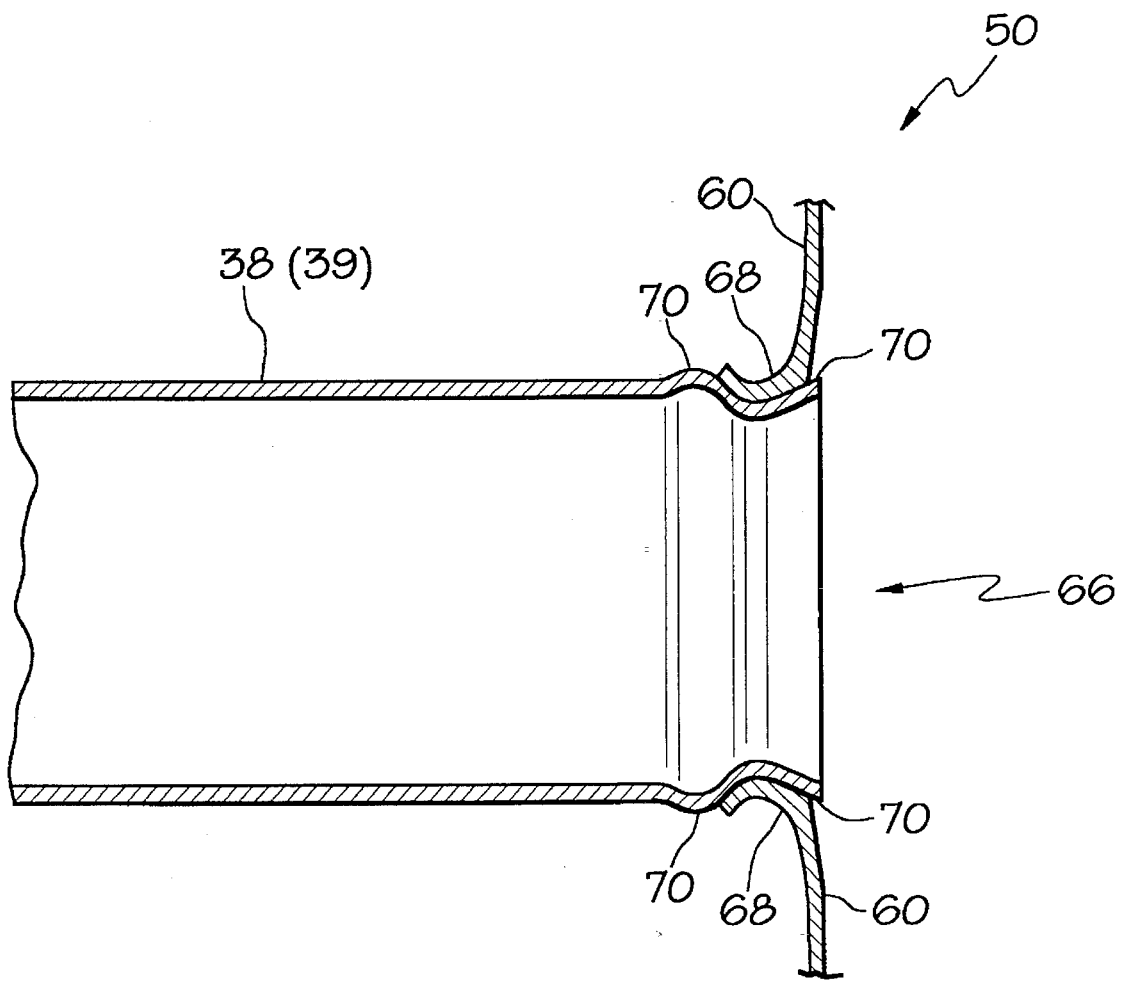
FIG. 6 is a cross-sectional schematic view of a swedge lock mechanism for interlocking the heat exchange tubes to the oven frame.

In accordance with the present invention, the heat exchange tubes 38a–39d are secured to the oven frame using a swedge lock 52, a mechanical fastening technique which allows the heat exchange tubes 38a and 39d to be interlocked into the oven frame so that movement of tubes 38 and 39 due to expansion and contraction can take place without damage to the tubes during heat up and cool down cycles. The swedge lock of the present invention is illustrated in FIG. 6. Typically, the heat exchange tubes 38a–38d are positioned through a corresponding hole 66 in the oven frame 60. The hole 66 typically has a beaded or flanged edge 68 on its circumference as shown in FIG. 6. The circumference of the heat exchange tubes 38 and 39 is then altered on both sides of the oven frame 60 using a swedge lock tool to provide an expanded circumference 70 on each side of the oven frame 60 to secure the heat exchange tubes 38a–38d to the oven frame 60. The circumference of the heat exchange tubes 38a–38d may be altered to provide a fully expanded circumference or to provide a partially expanded circumference in a regular or irregular pattern. This swedge lock technique allows the heat exchange tubes 38a, 38b, 38c and 38d to expand and contract without damage to the tube.

In conventional ovens, the heat exchange tubes are commonly welded to the oven frame. This technique prevents any movement of the tubes and over time the tubes undergo warping due to the constant expansion and contraction of the tubes during heat up and cool down cycles. Furthermore, the welded joints tend to corrode rapidly when exposed to the elevated temperature in the heat exchanger 33. Thus, the heat exchange tubes of conventional ovens experience premature failure causing frequent down time and undesirable maintenance expense.

The oven shown in the drawings is only an exemplary embodiment of the invention and it is to be understood that the invention is not so limited and that changes may be made therein without departing from the scope of the invention which is defined by the appended claims.

What is claimed is:

1. A rack oven comprising:

a baking chamber defined by a plurality of wall structures;

a door providing access to the interior of said baking chamber;

a steam generator located outside the oven chamber for providing moisture-containing air to said baking chamber;

a combustion chamber comprising a plurality of in-shot burners;

a heat exchanger in combination with said combustion chamber, said heat exchanger comprising a plurality of heat exchange tubes and a plurality of gas collection ducts;

a plenum;

a blower means located in said plenum for circulating air across said heat exchanger tubes and to said baking chamber; and a flue for exhausting combustion gases.

2. The oven of claim 1 wherein said plurality of in-shot burners numbers about 4 to 8.

3. The oven of claim 2 wherein each of said plurality of in-shot burners fires into a corresponding heat exchange tube at a rate of about 20,000 to 35,000 BTU's.

4. The oven of claim 1 wherein each of said in-shot burners contains a heat deflector.

5. The oven of claim 4 wherein said heat deflector is manufactured from stainless steel.

6. The oven of claim 1 wherein said heat exchanger comprises a first plurality of heat exchange tubes having a length of about 14 to 30 inches and a diameter of about 1 to 2 inches in communication with a corresponding number of said in-shot burners, and a second plurality of heat exchange tubes and said heat exchanger operates such that flame from said in-shot burners extends approximately three-fourths to substantially the full length of said first plurality of heat exchange tubes and hot combustion gases from said first plurality of heat exchange tubes circulate through said second plurality of heat exchange tubes to transfer sufficient heat to said air flowing across said heat exchange tubes.

7. The oven of claim 1 wherein said combustion chamber further comprises a pilot ignitor tube, a fuel supply line, a flame sensor, and fuel control means.

8. The oven of claim 7 wherein said pilot ignitor tube, said fuel supply line, said flame sensor, and said fuel control means are individually assembled into said combustion chamber.

9. The oven of claim 1 wherein said first plurality and said second plurality of heat exchange tubes are interlocked to a framework in said oven such that said heat exchange tubes can expand and contract without warping during heat up and cool down.

10. The oven of claim 9 wherein said first plurality and said second plurality of heat exchange tubes are interlocked to said framework by a swedge lock.

11. The oven of claim 1 wherein said first plurality and said second plurality of heat exchange tubes are manufactured from aluminized steel.

12. The oven of claim 1 wherein said heat exchanger further comprises ceramic tile inserts in at least the first gas collection duct.

13. The oven of claim 1 wherein said heated air circulated through said plenum is distributed to said baking chamber through a plurality of air distribution ports.

14. The oven of claim 1 wherein said combustion gases are exhausted from said flue by a ventor fan.

15. The oven of claim 14 wherein said ventor fan blows ambient air through said flue at a velocity higher than the velocity of said combustion gases thereby creating a vacuum in said combustion chamber to aspirate said combustion gases through said flue.

16. The oven of claim 14 wherein said ventor fan is powered by an electric motor.

17. The oven of claim 1 wherein steam is generated during the first 10 to 30 second of a baking cycle.

18. The oven of claim 17 wherein steam is generated intermittently.

19. The oven of claim 1 wherein said oven further comprises a rotating means for rotating a rack containing said goods to be baked.

20. A bakery oven for use in a commercial baking operation comprising:

a baking chamber for receiving a baking rack containing goods to be baked as a batch wherein said baking chamber is defined by a plurality of wall structures comprising a first wall having a plurality of adjustable air distribution ports for said circulating air entering said baking chamber and a second wall having a plurality of air distribution ports for said circulating air exiting said baking chamber;

means for rotating said baking rack;

a steam generator located between said baking chamber and said heat exchanger for generating steam and saturating said circulating air;

a combustion chamber comprising about 4 to 8 in-shot burners, each burner containing a stainless steel deflector inside said burner tube, means for supplying fuel to said in-shot burners, means for supplying oxygen to said in-shot burners, a pilot ignitor tube containing an ignitor, a flame sensor, and fuel control means;

a heat exchanger comprising a first plurality of 4 to 8 aluminized steel heat exchanger tubes and a plurality of combustion gas collection ducts, wherein each of said first plurality of heat exchanger tubes having a length of about 14 to 30 inches and a diameter of about 1 to 2 inches is in communication with a corresponding in-shot burner, and a second plurality of aluminized steel heat exchange tubes, said heat exchanger operating such that flame from said in-shot burners extends approximately three-fourths the length of said first plurality of heat exchange tubes, wherein each of said in-shot burner fires into said heat exchange tubes at a rate of about 20,000 to 35,000 BTU's, and hot combustion gases circulate through said second plurality of heat exchange tubes, to further heat said circulating air, said heat exchanger tubes being interlocked to framework by a swedge lock such that said heat exchanger tubes can expand and contract without warping during heat up and cool down;

protective ceramic tile inserts in at least the first combustion gas collection duct at the exit end of said first set of heat exchange tubes;

a plenum;

one or more blowers located in said plenum, wherein said blowers pull air through said steam generator and circulates said air across said heat exchanger tubes and into said baking chamber;

an exhaust flue for expelling hot combustion gases from said combustion unit; and a ventor blower fan for blowing ambient air through a reduced opening into said exhaust flue to generate a high velocity air flow, said air flow capable of aspirating said combustion gases through said flue.

* * * * *